March 3, 1970   J. M. RAIT   3,498,019
METHOD AND APPARATUS FOR FORMING SEALED PACKAGES
Filed Oct. 23, 1965   4 Sheets-Sheet 1

INVENTOR.
Joseph M. Rait
BY Eugene C. Zahm
ATTORNEY.

March 3, 1970  J. M. RAIT  3,498,019
METHOD AND APPARATUS FOR FORMING SEALED PACKAGES
Filed Oct. 23, 1965  4 Sheets-Sheet 2
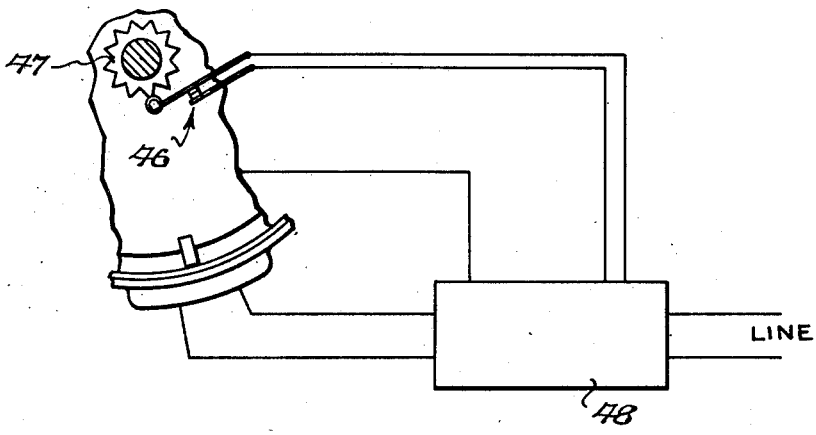
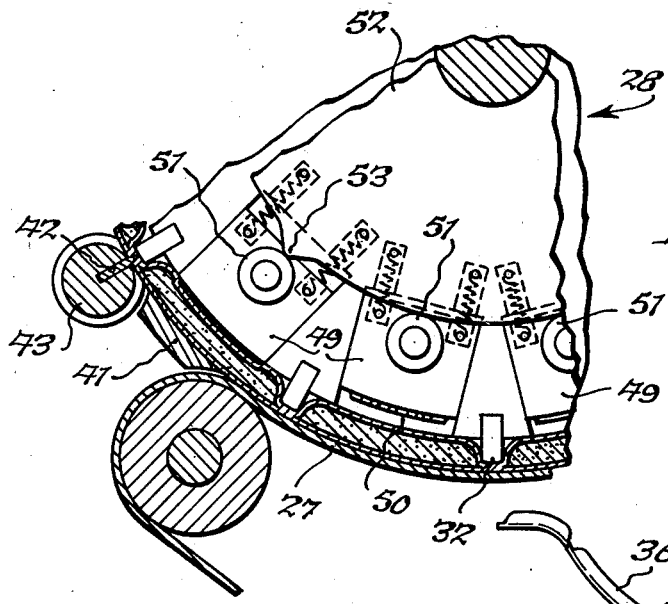
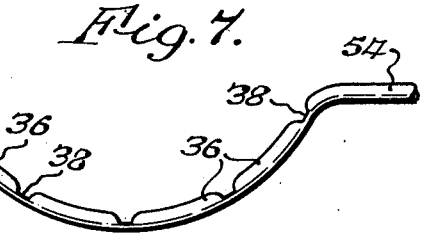
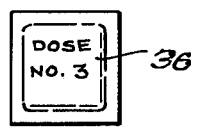
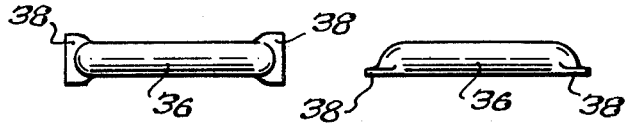
INVENTOR.
Joseph M. Rait
BY Eugene C. Ziehm
ATTORNEY.

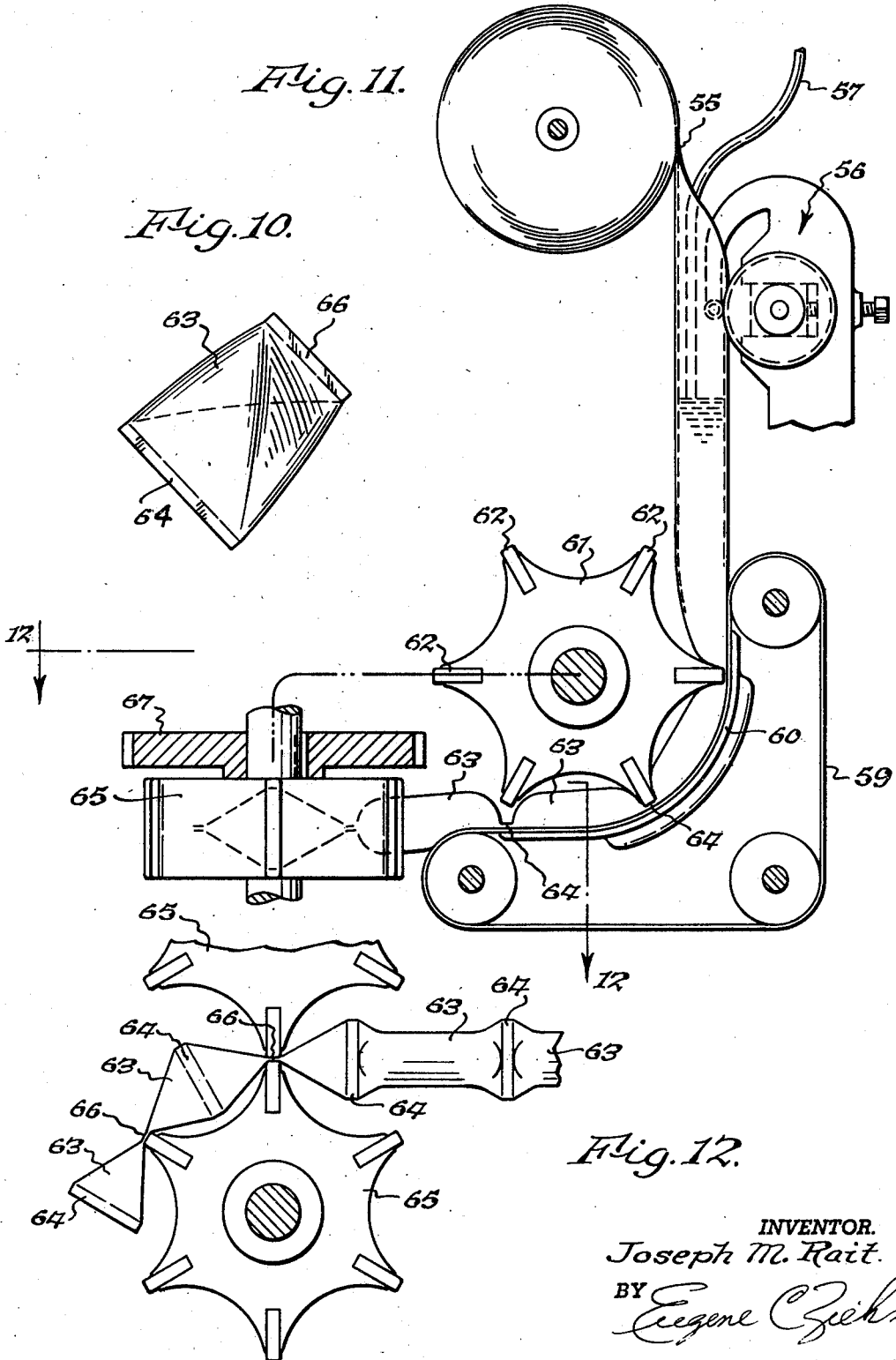

March 3, 1970 J. M. RAIT 3,498,019
METHOD AND APPARATUS FOR FORMING SEALED PACKAGES
Filed Oct. 23, 1965 4 Sheets-Sheet 4
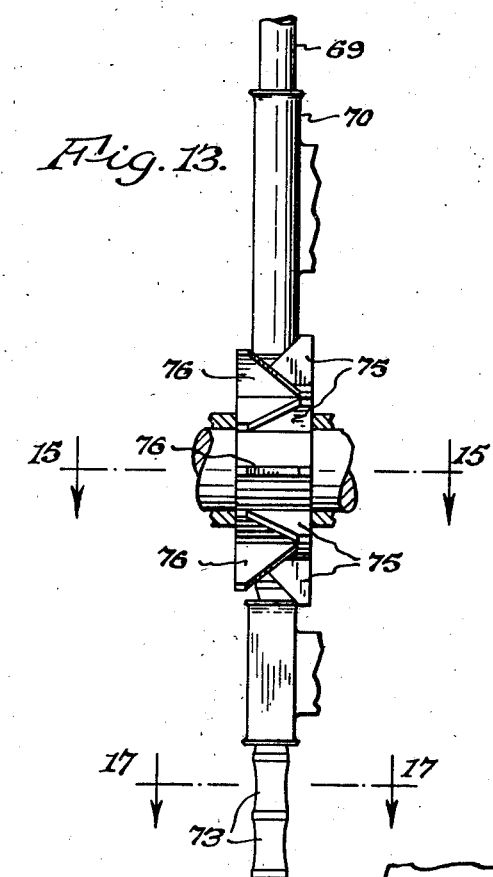
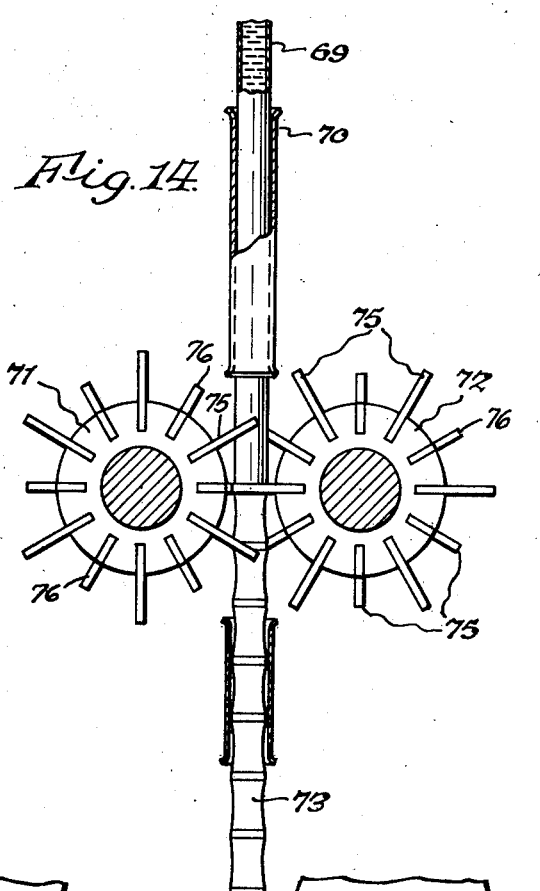
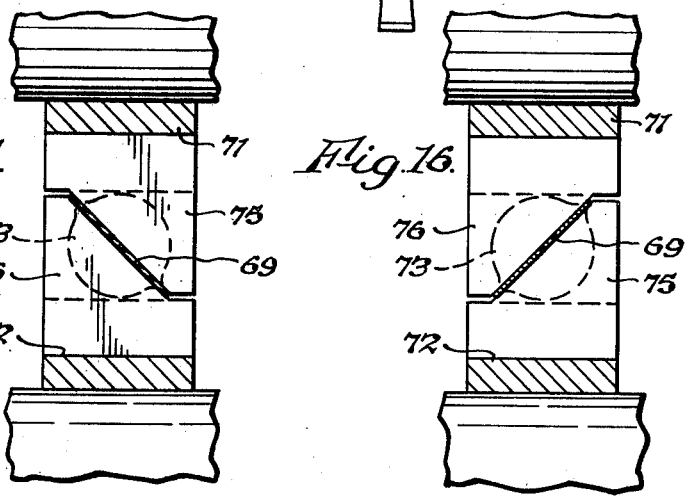
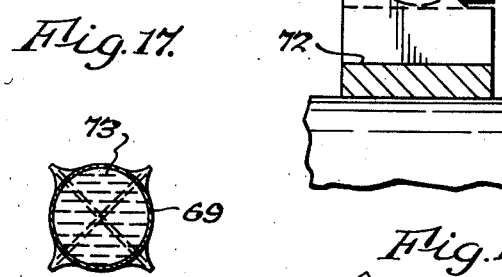
INVENTOR.
Joseph M. Rait
BY
Eugene C. Ziehm
ATTORNEY.

United States Patent Office 3,498,019
Patented Mar. 3, 1970

3,498,019
METHOD AND APPARATUS FOR FORMING SEALED PACKAGES
Joseph M. Rait, Snyder, N.Y.
(1100 Amherst St., Buffalo, N.Y. 14216)
Filed Oct. 23, 1965, Ser. No. 503,097
Int. Cl. B65b 9/02, 9/12, 51/30
U.S. Cl. 53—28                                            7 Claims

ABSTRACT OF THE DISCLOSURE

An endless belt conveyor continuously delivers sheets of heat sealable plastic sheets from a source to filling station where material to be packaged is deposited between layers of the plastic sheet and thence to a sealing station. A rotating sealing drum compresses the layers of plastic sheet together at intervals in the presence of heat supplied by an arcuate heated platen which is concentric with the drum and circumscribes a substantial arcuate surface of the drum. At the outlet of the sealing station, a rotating cutter synchronized with the rotation of the drum separates the sealed package into individual units. In one embodiment a printing device imprints a label on each package. Another embodiment utilizes a single layer of sheet material; a sealing station for forming sheet material into a tubular configuration precedes the filling station and a second sealing station for forming the tube into individual packets follows the filling station.

---

This invention relates to a method of and apparatus for forming sealed plastic packages. More particularly, it relates to a method of an apparatus for continuously forming sealed, disposable plastic envelopes containing a measured amount of a solid or liquid material therein.

An object of the present invention is to provide a method of forming sealed disposable plastic packages containing a measured amount of a material which may be in solid or liquid form.

Another object is to provide a continuous method of sealing plastic sheets together to form a package containing a predetermined measured amount of material.

Another object of the invention is to provide an apparatus for forming sealed plastic packages.

A further object is to provide an apparatus for continuously sealing a measured amount of a solid or liquid material in a package of thermoplastic material.

Various other objects and advantages will appear from the following description of the invention, and the novel features will be particularly pointed out in the appended claims.

The invention will be more fully explained hereinafter with reference to the drawings in which:

FIGURE 4 is a schematic wiring diagram of an embodiment of the present invention;

FIGURE 5 is a sectional view of another embodiment of the present invention;

FIGURE 6 is a top plan view of one form of sealed plastic package formed by the method and apparatus of the present invention;

FIGURE 7 is a side view illustrating the manner in which sealed packages are formed from a continuous plastic tube;

FIGURE 8 is a top plan view of one form of plastic package formed by the method and apparatus of this invention;

FIGURE 9 is a side view of the package shown in FIGURE 8;

FIGURE 10 is a perspective view of another form of a sealed plastic package formed by the present invention;

FIGURE 11 is a sectional view of another embodiment of the apparatus of the present invention;

FIGURE 12 is a sectional view taken along lines 12—12 in FIGURE 11;

FIGURE 13 is a side view of a part of another embodiment of the apparatus of the present invention;

FIGURE 14 is a plan view, partly in section of the apparatus shown in FIGURE 13, taken at 90° to the view shown in FIGURE 13;

FIGURE 15 is a sectional view taken along lines 15—15 of FIGURE 13;

FIGURE 16 is a sectional view similar to that shown in FIGURE 15 illustrating another position of the apparatus;

FIGURE 17 is a sectional view of a sealed plastic package taken along lines 17—17 of FIGURE 13, and FIGURE 18 is an elevational view of a package formed by the embodiment illustrated in FIGURES 13–16.

Figure 1:
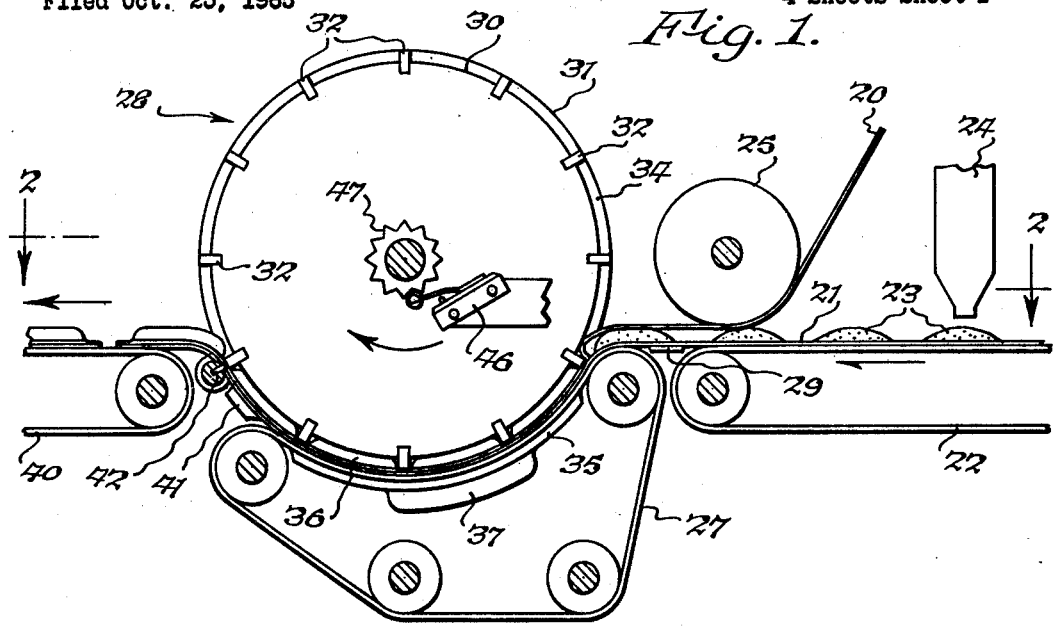
FIGURE 1 is a sectional view of the apparatus of one embodiment of the present invention showing the manner in which sealed plastic packages are formed.
Figure 2:
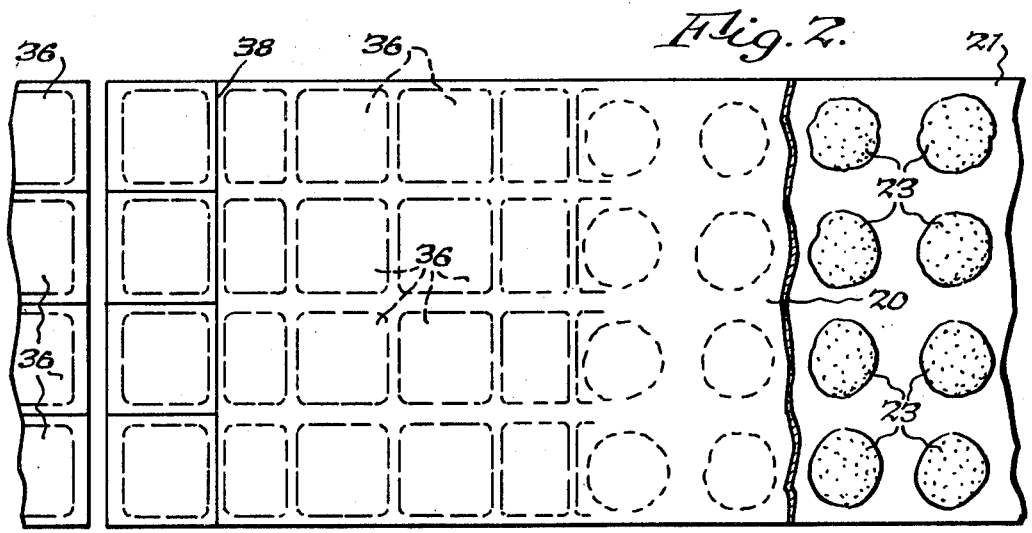
FIGURE 2 is a top plan view taken along lines 2—2 in FIGURE 1, showing the various stages of forming the plastic packages of the present invention.

Referring now more particularly to the drawings, according to one embodiment of the present invention, as shown in FIGURE 1, there is provided an upper sheet 20 and a lower sheet 21 of a relatively thin, tough, flexible thermoplastic material, such as polyethylene, polypropylene, and the like. The lower sheet 21 is carried by a first endless belt 22 and is moved by the belt in the direction indicated by the arrow. As this lower sheet is moved by the belt, a measured amount of the material to be packaged 23 is deposited onto the upper surface of the lower sheet 21 from a hopper 24, the material being deposited in measured increments across the width of the sheet as shown in FIGURE 2. After the material 23 has been deposited on the upper surface of lower sheet 21, an upper sheet 20 is brought down over the material, this upper sheet being parallel to and having the same width as lower sheet 21. The upper sheet is maintained a predetermined distance above the lower sheet by roller 25. The lower sheet 21 is then transferred to a second endless belt 27 positioned below a rotating compartmentized cylinder 28. A first supporting plate 29 is positioned between the end of the first endless belt 22 and the beginning of a second endless belt 27 to support the lower sheet 21 during transfer therebetween.

The cylinder 28 is mounted for rotational movement about a central shaft, the cylinder rotating in the direction indicated by the arrow. On the outer surface 30 of the cylider there are secured a number of annular rings 31 extending above the outer surface of the cylinder a distance equal to the thickness of the package to be formed. A plurality of transverse ribs 32 also are secured on the outer surface 30 of the cylinder 28, the ribs extending parallel to the axis of rotation of the cylinder. Thus the ribs 32 are normal to the annular rings 31 and are secured thereto, defining therebetween a plurality of compartments 34 over the surface of the cylinder. Preferably the cylinder extends over the entire width of the plastic sheets.

A heated platen 35, having about the same curvature as the cylinder 28, is positioned below the second endless belt and maintains the endless belt 27 and plastic sheets in position over a substantial area of the cylinder. The movement of the upper and lower plastic sheets is synchronized with the rotation of the cylinder so that the compartments 34 on the surface of the cylinder are positioned over the deposited material 23 as the sheets are moved below the cylinder. In this manner the annular rings 31 and the longitudinally extending ribs 32 surround the material and press the upper plastic sheet 20 down against the lower sheet 21, thereby forming a plurality of packages 36 of uniform size and shape. A heating means 37 is provided to heat the platen 35 whereby the thermoplastic sheets are heated and softened as they are carried over the platen. In this manner as the plastic sheets are carried past the cylinder, over the platen, the sheets are heated and softened so that the upper sheet is sealed to the lower sheet, as at 38 in FIGURE 2, in those areas where they are pressed together by the annular rings and transverse ribs.

Figure 3:
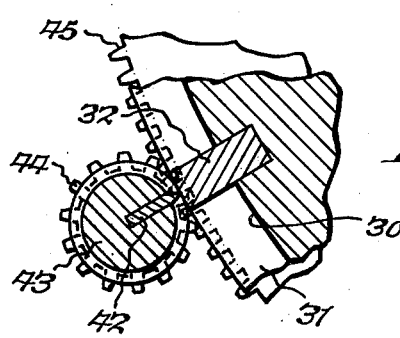
FIGURE 3 is an enlarged sectional view of the cutting knife and forming cylinder shown in FIGURE 1.

A third endless belt 40 is positioned adjacent the discharge end of the second endless belt, and receives the sealed packages. A second supporting plate 41 and a longitudinal cutting knife 42 are positioned between the second and third belts to support the sealed sheets and cut the sealed packages into longitudinal strips as they are transferred onto the third belt, in order to facilitate handling of the sealed packages. As shown more clearly in FIGURE 3, the cutting knife 42 is fixedly secured in a rotating shaft 43 having a gear 44 mounted thereon, this gear meshing with and being driven by cylinder gear 45 mounted on the shaft carrying the cylinder 28. The knife rotates with shaft 43 and is adapted to contact the transverse ribs on the cylinder thereby cutting the plastic sheets passing between the knife edge and the cylinder. The number of teeth on gear 44 is preferably the same as the number of teeth on cylinder gear 45 between adjacent ribs, so that gear 44 completes one revolution between adjacent ribs. The size of gear 44 may be increased, if desired, so that the knife contacts only every second or third rib. After the packages have been cut into longitudinal strips, they may, if desired, be cut laterally to provide individual pockets, as shown in FIGURE 6.

Preferably, heat is continuously applied to platen 35 by the heating means 37 so that the plastic sheets are completely sealed prior to passing the cutting knife. In order to ensure complete sealing of the thermoplastic sheets, means may be provided to supply additional heat over certain portions of the second endless belt. Thus, as shown in FIGURE 1, a microswitch 46 may be positioned near the cylinder, the switch being actuated by toothed wheel 47 which is mounted on the cylinder shaft. The teeth on wheel 47 are aligned with the transverse ribs so that as the wheel 47 rotates with the cylinder the teeth actuate the switch which controls the supply of additional heat to certain portions of the platen.

Thus, as shown in FIGURE 4 the switch 46 may be connected to a transformer, high frequency heater, high frequency vibrator and the like, generally indicated at 48, which is connected to an electric circuit. An electron potential difference may be created between the cylinder and the platen in any conventional manner well known to those skilled in the art, such as by means of the wiring schematically shown in FIGURE 4. The wheel 47 is adapted to rotate at such speed that the teeth of the wheel always are aligned with the transverse ribs 32. In this manner additional heat or electron flow is provided to the platen in the area immediately adjacent the ribs, thereby ensuring complete sealing of the upper sheet to the lower sheet.

The forming cylinder may also be provided with means to imprint or label the top surface of the upper plastic sheet 20. Thus, as shown in FIGURE 5, a printing member 49 having a printing face 50 and cam followers 51 are resiliently secured on the cylinder 28, as by springs and the like, above each of the compartments 34 formed over the surface of the cylinder. A stationary cam 52 is carried on the cylinder central shaft, the cam having a projecting portion 53 maintained opposite the second supporting plate 41. As the plastic sheets are sealed and carried past the end of the second endless belt, the projecting portion 53 on the cam engages the cam follower on the printing member 49 causing the printing member to be depressed so that the printing face is pressed down against the top surface of the upper plastic sheet. In this manner the sealed packages are printed, as shown in FIGURE 6.

While the invention has been described hereinabove in connection with the packaging of solid materials, it is to be understood that liquids may also be packaged in the same manner. FIGURE 7 illustrates one manner in which liquids are packaged by the present invention utilizing the apparatus shown and described in FIGURE 1. As illustrated in this figure, a thermoplastic tube, sealed at one end is filled with a liquid and passed under the forming cylinder, whereby transverse ribs on the cylinder force the top portion of the tube into contact with the bottom portion thereby sealing the portions together, as at 38 to form small packages 36. As described hereinabove, the continuous strip of such packages are subsequently cut into individual pockets by the knife means 42 shown in FIGURES 1 and 3 to provide packages of the type shown in FIGURES 8 and 9.

FIGURE 11 illustrates another manner in which liquids may be sealed in small plastic packages. According to this embodiment of the invention, a sheet of thermoplastic material 55, carried by a roll, is formed into a tube and continuously moved past sealing means 56 which seals the ends of the sheet together to form a continuous plastic tube, open at its upper end. The liquid to be packaged is then introduced into the plastic tube by the filling tube 57, the liquid level being maintained below the sealing means 56. The vertical, liquid-containing plastic tube is carried by an endless belt 59 over a fixed heated platen 60. A first sealing wheel 61, mounted for rotational movement on a central shaft, is positioned adjacent the endless belt and forces the top surface of the plastic tube against the bottom surface of the tube to seal the tube into small packages 63 as the plastic becomes softened by the heat from the platen. Thus, sealing wheel 61 is provided with a number of spaced ridges 62 on the perimeter thereof, with the perimeter of the wheel, between the ridges, being concave. The wheel 61 is spaced from the endless belt a distance such that only the ridges 62 press and seal the surfaces of the plastic tubing together as at 64. The ridges 62 on the wheel 61 are spaced apart a distance equal to the desired length of the package to be formed.

As the sealed, liquid-containing, packages pass from the endless belt, they pass between second and third sealing wheels 65, these wheels having substantially the same shape as wheel 61. These wheels 65 are mounted for rotation on a central shaft which is normal to the shaft about which the sealing wheel 61 rotates. The rotation of wheels 65 is synchronized with the rotation of wheel 61, so that the ridges on wheels 65 engage the sealed packages 63 at about the midpoint of the package. The two wheels 65 are positioned sufficiently close together so that the plastic surfaces of the tube are forced against one another and sealed together, as at 66, this second seal being at right angles to the first seal 64. Heating means (not shown) are provided to heat and soften the plastic as it passes between wheels 65, thereby ensuring sealing. The continuous strip of plastic packages are then cut into individual packages by any conventional means. In this manner, small, four-sided, liquid containing packages are formed, as illustrated in FIGURE 10, the seal at one end of the package being at right angles to the seal at the other end of the package.

In order to synchronize the rotation of wheels 65 with wheel 61, intermeshing gear means are provided on each of the shafts carrying the wheels. Thus gear 67, which drives wheels 65 meshes with a corresponding gear (not shown) positioned on the shaft about which wheel 61 rotates.

FIGURES 13 and 14 illustrate another manner in which sealed plastic packages may be formed according to the present invention, FIGURE 14 being viewed at 90° to FIGURE 13. According to this embodiment a continuous palstic tube 69 sealed at one end containing the material to be packaged and supported by support means 70, is passed between a pair of cooperating sealing wheels 71 and 72 to seal the surfaces of the plastic together as they pass between the wheels, thereby forming a plurality of small sealed packages 73 from the continuous tube. The continuous strip of sealed packages may be cut into individual packages if desired. The wheels 71 and 72, which rotate in opposite directions, are provided with a plurality of teeth 75, 76, the teeth being spaced apart a distance equal to the desired length of the sealed package to be formed, both wheels having the same number of teeth. In order to seal the surfaces of the plastic together as it passes between the wheels, the teeth on each wheel are tapered, with adjacent teeth having different inclinations. Thus, as shown in FIGURE 13, teeth 75 are tapered from the right side of the tooth downwardly to the left side, while teeth 76, positioned between teeth 75, are tapered from the left side downwardly to the right side of the teeth. The wheels are positioned so that the teeth rotate over the plastic tube with the rotation of the wheels being synchronized so that teeth having opposite angles of inclinations contact opposing surfaces of the tube Thus as shown in FIGURES 15 and 16, the plastic tube is compressed between a tooth 75 on wheel 71 and a tooth 76 on wheel 72 to seal the surfaces of the plastic thus forced together. In this manner the small sealed packages are formed, the seal at one end of the packages being at right angles to the seal at the other end, as shown in FIGURES 17 and 18. Heating means (not shown) are preferably provided to heat and soften the plastic as it is compressed between the teeth to ensure complete sealing of the packages.

It will be understood that various changes in details, materials, steps and arrangements of parts, which have herein been described and illustrated in order to explain the nature of the invention, may be made by those skilled in the art within the principle and scope of the invention as expressed in the appended claims.

Thus while the invention has been described using plastic sheets, such as sheets of polyethylene and polypropylene in forming the packages, it is to be understood that other materials capable of being sealed together may also be used in the present invention. For example, laminated sheets such as plastic laminated to thin cardboard, paper, metal foil, other plastics and combinations of such materials are also well adapted for use as the package forming material in the invention. Similarly, while sealing has been described as being performed in the presence of heat, other sealing means such as ultra-sonics, adhesives and the like may also be used in conjunction with the pressure applied by the sealing surfaces. In addition it is apparent that the spacing between the annular rings and transverse ribs on the forming cylinder in FIGURE 1, and the ridges and teeth on the sealing wheels in FIGURES 11, 13 and 14 may be varied or adjusted as desired according to the size and shape of the package desired to be formed.

I claim:

1. A method of forming sealed plastic packages containing a measured amount of material which comprises depositing a measured amount of a material to be packaged on the top surface of a first thin, thermoplastic sheet, placing a second thermoplastic sheet on the material thus deposited, said second sheet being co-extensive with said first sheet, continuously conveying said first and second thermoplastic sheets over a heating means adapted to soften said thermoplastic sheets, continuously compressing said softened sheets together at regular spaced increments around the material deposited therebetween, by conveying said softened sheets into contact with a compressing cylinder during exposure to heat, thereby forming a plurality of sealed plastic packages, conveying said sealed packages past said compression cylinder and cutting said sealed packages into individual, sealed packages containing the deposited material.

2. An aparatus for forming sealed plastic packages which comprises means for introducing a measured amount of a material to be packaged between two surfaces of a thermoplastic material, conveying means for continuously moving said two surfaces and the material introduced therebetween, heating means providing a temperature sufficient to soften said thermoplastic material, said conveying means continuously moving said material over said heating means, pressure means positioned above said conveyor means and heating means, said pressure means being adapted to continuously compress and seal the two surfaces of said thermoplastic material together around the material to be packaged during exposure to said heating means, thereby forming a sealed package.

3. An apparatus for forming sealed plastic packages containing a measured amount of material which comprises a first endless belt for supporting and conveying a first thin, thermoplastic sheet, discharge means positioned above said first endless belt for depositing a measured amount of the material to be packaged on the top surface of said first thermoplastic sheet, means for positioning a second thermoplastic sheet on the deposited material, a heated platen, a forming cylinder positioned above said heated platen and a second endless belt having a portion disposed between said heated platen and said second endless belt, said second endless belt being positioned adjacent said first endless belt for conveying said first and second sheets and said deposited material between said heated platen and said forming cylinder.

4. An apparatus for forming sealed liquid containing plastic packages which comprises
    sealing means for sealing together the edges of a thermoplastic sheet thereby forming a continuous plastic tube,
    liquid filling means for introducing the liquid to be packaged into said plastic tube, a first compression wheel,
    conveyor means for continuously moving said liquid containing means between a heating means, positioned along one surface of said tube, and said first compression wheel positioned along the surface of the tube opposite said heating means,
    said heating means being adapted to heat and soften the plastic tube passing over it, and said first compression wheel being adapted to compress the upper surface of said tube against the lower surface of said tube while said surfaces are softened to seal the surfaces together at regular spaced increments,
    said conveyor means being adapted to move said sealed tube past said heating means and compression wheels,
    a pair of sealing wheels adjacent the end of said endless belt normal to said first compression wheel, and
    means for continuously moving said sealed packages between said sealing wheels to effect a second seal midway between and normal to the original seals in the tube.

5. The apparatus as defined in claim 4 in which said compression wheel and sealing wheels are each provided with a plurality of raised ridges on the perimeter thereof, the raised ridges being spaced apart a distance equal to the desired length of the package to be formed, and the perimeter of the wheel, between said ridges is concave in shape.

6. The apparatus as defined in claim 5 in which synchronizing means are provided to synchronize the rotation of the compression wheel and the sealing wheels so that the ridges on said sealing wheels engage and compress the sealed package at about the midpoint of said package, the sealing wheels being positioned sufficiently close together so that the plastic surfaces passing therebetween are compressed and sealed together.

7. A machine for packaging material in heat sealable sheet material comprising a rotatable cylinder having a plurality of spaced apart ribs forming compartments on the surface thereof, a heated platen substantially concentric with said rotatable drum and coextensive with and closely adjacent to a substantial portion of the surface of said drum, said spaced apart ribs and said platen being disposed in cooperating relationship to press opposing surfaces of sheet material together along the ribs, conveyor means for continuously moving the heat sealable sheet material intermediate said drum and said heated platen whereby heat and pressure are concurrently and continuously applied to seal opposed surfaces of the sheet material together.

References Cited

UNITED STATES PATENTS

| | | | |
|---|---|---|---|
| 2,486,759 | 11/1949 | Pfeiffer | 53—28 |
| 2,597,041 | 5/1952 | Stokes | 53—141 |
| 2,828,590 | 4/1958 | Swartz | 53—28 |
| 3,163,971 | 1/1965 | Loliger | 53—28 |
| 3,184,895 | 5/1965 | O'Connor | 53—30 X |

FOREIGN PATENTS 544,047  1/1956  Belgium.

THERON E. CONDON, Primary Examiner

E. F. DESMOND, Assistant Examiner

U.S. Cl. X.R.

53—180